Patented Jan. 22, 1952

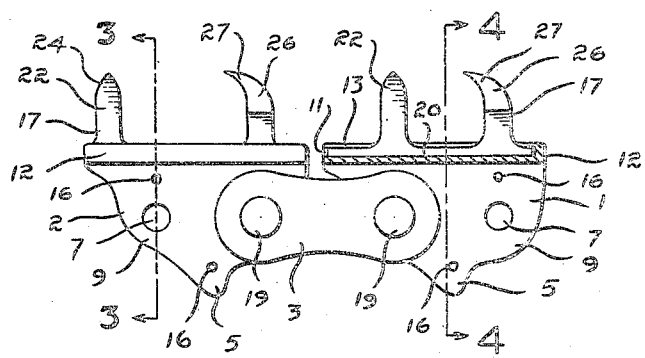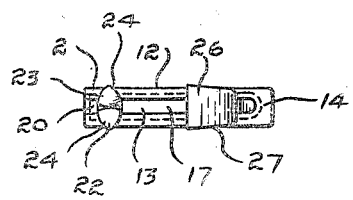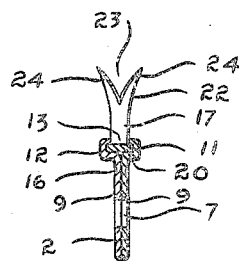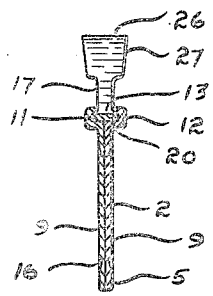
INVENTOR
CHARLES JAMES TWEEDIE
ATTORNEY

2,583,243

UNITED STATES PATENT OFFICE 2,583,243

CHAIN SAW

Charles James Tweedie, Fanny Bay,
British Columbia, Canada

Application April 3, 1950, Serial No. 153,522

1 Claim. (Cl. 143—135)

My invention relates to improvements in chain saws.

The object of the invention is to provide a chain saw with tooth supporting links and connector links, wherein each tooth supporting link is provided with at least one cutting tooth and a raker tooth. A further object is to provide side cutters to the cutting teeth which are aligned transversely of the chain to overcome the transverse thrust which causes the teeth to vibrate or weave transversely, thereby causing a serious loss of power in drawing the cutters through the wood. And a still further object is to provide that each raker and its preceding side cutters shall move absolutely in unison, so that the raker must travel strictly in the same line as the cutting teeth without deviation transversely or towards the base of the kerf cut. It is also an object to provide a chain saw having inserted teeth in which the links to receive the teeth are extremely economical to manufacture and which provide a simple holding means whereby the teeth can be easily taken out or replaced in the link without the need for tools.

Referring to the drawings:

Figure 1 is an elevational view, part in section, of the invention.

Figure 2 is a plan view of a tooth supporting link fitted with cutting and raker teeth.

Figures 3 and 4 are sectional views taken on the lines 3—3 and 4—4 respectively of Figure 1.

In the drawings like characters of reference indicate corresponding parts in each figure.

The numeral 1 indicates a length of saw chain consisting of links 2 and 3, the links 2 will be referred to as centre links and the links 3 will be referred to as side links. The centre links 2 are each provided with a sprocket tooth 5 on its underside by which the chain is driven when in use and is provided also with rivet holes 7. Each of said centre links is made up with side plates 9 provided with a substantially rectangular channel 11 formed along its upper edge by a stamping or other suitable process. The grooves 11 of mating plates are so disposed as to form a horizontal head 12 having a slot 13 extending from the front end of the centre link to a stop 14 formed at the rear end of the link. The side plates 9 are formed of resilient material and are preferably united together by three spot welds 16, two of which would preferably be disposed adjacent the under edge of the head 12, so as to leave a slight flexibility along the centre line of the head, permitting same to resiliently grip a tooth element 17 slidably inserted therein. Pairs of side links 3 are attached to adjacent centre links 2 by rivets 19 in the usual way.

Each tooth element 17 consists of a narrow base 20 which is adapted to wedge slightly into the slotted head 12 of a centre link engaging the base of each of the channels 11. At the forward end of the base 20 a vertical tooth 22 is provided, which is swaged to the width of the desired cut and is split longitudinally as at 23 to form cutters 24 which are sharpened as required to make two incisions of predetermined spacing in the wood cut. Adjacent the rear of the base 20 a raker hooked tooth 26 is provided which is also swaged as at 27 to the width of the cut. The raker tooth 26 being an appreciable distance to the rear of the cutting tooth 17 serves to steady the forward movement of the centre link on which it is carried and prevents it from cutting more to one side than the other, or from weaving in the cut, consequently less power is required to run the chain in operation that that required for standard chains.

While the present application shows the use of inserted tooth elements it will be obvious that the same cutting and raker tooth arrangement could be provided in the conventional single ply link or tooth blank.

The above described chain saw has the added advantage in that should one of the teeth become dull or damaged the tooth element can be quickly replaced.

What I claim as my invention is:

A chain saw comprising center links and side links pivotally connected together, said center links being formed with a pair of mating slightly flexible side plates, each of said side plates having an offset portion to provide a substantially rectangular channel adjacent one edge with the channel opening at one side face of the plate, said plates being positioned with said side faces abutting each other and said channels opposing each other to define a head having a key slot extending along a major portion of said edge, a stop at one end of said slot, and an inserted tooth element having a base member adapted for insertion into said slot, said plate members being secured together adjacent said head to provide slight flexibility along the center line of the head and to afford a resilient grip upon the tooth element.

CHARLES JAMES TWEEDIE.

REFERENCES CITED

The following references are of record in the file of this patent:

UNITED STATES PATENTS

| Number | Name | Date |
|---|---|---|
| 1,339,091 | Benefiel | May 4, 1920 |
| 1,483,387 | Serin | Feb. 12, 1924 |
| 1,979,001 | Kankos | Oct. 30, 1934 |
| 2,351,112 | Day | June 13, 1944 |

FOREIGN PATENTS

| Number | Country | Date |
|---|---|---|
| 218,065 | Great Britain | July 3, 1924 |